US010773826B1

(12) United States Patent
Lapujade et al.

(10) Patent No.: US 10,773,826 B1
(45) Date of Patent: Sep. 15, 2020

(54) ADJUSTABLE AIMING AIRCRAFT LIGHT ASSEMBLY

(71) Applicant: GOODRICH LIGHTING SYSTEMS, INC, Oldsmar, FL (US)

(72) Inventors: Philippe Lapujade, Chandler, AZ (US); Adam M. Schimke, Gilbert, AZ (US)

(73) Assignee: Goodrich Lighting Systems, Inc., Oldsmar, FL (US)

( * ) Notice: Subject to any disclaimer, the term of this patent is extended or adjusted under 35 U.S.C. 154(b) by 0 days.

(21) Appl. No.: 16/653,580

(22) Filed: Oct. 15, 2019

(51) Int. Cl.
| | | |
|---|---|---|
| *B64D 47/04* | (2006.01) | |
| *F21S 41/19* | (2018.01) | |
| *F21S 41/55* | (2018.01) | |
| *F21S 41/39* | (2018.01) | |
| *F21S 41/151* | (2018.01) | |
| *F21S 41/143* | (2018.01) | |
| *F16H 19/04* | (2006.01) | |
| *F21S 41/36* | (2018.01) | |
| *F21W 107/30* | (2018.01) | |
| *F21W 104/00* | (2018.01) | |
| *F21Y 115/10* | (2016.01) | |

(52) U.S. Cl.
CPC ............. *B64D 47/04* (2013.01); *F16H 19/04* (2013.01); *F21S 41/143* (2018.01); *F21S 41/151* (2018.01); *F21S 41/192* (2018.01); *F21S 41/36* (2018.01); *F21S 41/39* (2018.01); *F21S 41/55* (2018.01); *F21W 2104/00* (2018.01); *F21W 2107/30* (2018.01); *F21Y 2115/10* (2016.08)

(58) Field of Classification Search
CPC ...... B64D 47/04; F21S 41/143; F21S 41/151; F21S 41/192; F21S 41/36; F21S 41/39; F21S 41/55; F21V 14/02; F21V 19/003; F21V 19/0035; F21V 19/02; F21V 23/006
See application file for complete search history.

(56) References Cited

U.S. PATENT DOCUMENTS

| | | | |
|---|---|---|---|
| 6,076,943 A * | 6/2000 | Lassovsky | F21V 7/005 362/220 |
| 6,244,728 B1 | 6/2001 | Cote et al. | |
| 7,959,326 B2 | 6/2011 | Laporte | |
| 8,801,240 B2 | 8/2014 | Edupalli et al. | |
| 9,562,655 B2 | 2/2017 | Villard | |
| 9,816,672 B1 * | 11/2017 | Broughton | F21V 7/0066 |
| 2004/0057463 A1 * | 3/2004 | Fu | H02K 7/1853 370/469 |
| 2005/0024870 A1 * | 2/2005 | Coushaine | F21V 29/505 362/249.02 |
| 2012/0057333 A1 * | 3/2012 | Bhardwaj | F21L 13/06 362/183 |

(Continued)

*Primary Examiner* — Zheng Song
(74) *Attorney, Agent, or Firm* — Snell & Wilmer L.L.P.

(57) ABSTRACT

A light assembly for use on an aircraft is disclosed herein. The light assembly comprises a reflector assembly, a printed wiring assembly, and a bezel assembly. The bezel assembly may comprise a first worm screw. The first worm screw may be configured to translate at least one of the reflector assembly and the printed wiring assembly in a first direction. The bezel assembly may comprise a second worm screw. The second worm screw may be configured to translate at least one of the reflector assembly and the printed wiring assembly in a second direction.

18 Claims, 9 Drawing Sheets

(56) References Cited

U.S. PATENT DOCUMENTS

| | | | |
|---|---|---|---|
| 2012/0140441 A1* | 6/2012 | Chang | F21V 19/02 |
| | | | 362/95 |
| 2014/0085864 A1* | 3/2014 | Wu | F21V 19/001 |
| | | | 362/97.1 |
| 2015/0023031 A1* | 1/2015 | Endo | F21V 15/04 |
| | | | 362/427 |
| 2017/0175979 A1* | 6/2017 | Tang | F21V 17/02 |
| 2018/0142844 A1* | 5/2018 | Kohn | F21V 17/02 |
| 2019/0049099 A1* | 2/2019 | Baker | F21V 21/34 |
| 2019/0241277 A1 | 8/2019 | Zhou et al. | |

* cited by examiner

ADJUSTABLE AIMING AIRCRAFT LIGHT ASSEMBLY

FIELD

The present disclosure relates to aircraft lighting systems, and, more specifically, to aircraft light assembly with adjustable aiming.

BACKGROUND

Aircraft often have one or more light assemblies which may be adjusted after installation on an aircraft by an aircraft manufacturer. Various manufacturers desire different light angles for their aircraft lighting systems. The space envelope reserved for the light assembly may include the volume occupied by the light assembly in any of the adjustable orientation.

SUMMARY

An aircraft light assembly is disclosed herein. The aircraft light assembly comprises a reflector assembly including a reflector housing and a reflector; a printed wiring assembly (PWA) comprising a frame, a middle rail, and a light emitting diode (LED), the frame having a proximal end rail and a distal end rail, the middle rail extending from the proximal end rail to the distal end rail, the LED coupled to the middle rail and disposed proximate the reflector, the proximate end rail comprising a first PWA worm gear; and a bezel assembly comprising a frame and a first worm screw disposed in a slot of the frame, the first worm screw configured to translate the PWA in a first direction.

In various embodiments, the first worm screw engages the first PWA worm gear. The reflector housing may comprise a proximal end having a proximal end slot, the first worm screw disposed within the proximal end slot. The reflector housing may comprise a proximal end having a reflector worm gear. The first worm screw may engage the reflector worm gear. The aircraft light assembly may further comprise a coating disposed between the frame of the PWA and the reflector assembly. The frame of the PWA may further comprise a first side rail extending from the proximal end rail and the distal end rail, and a second side rail opposite the first side rail and extending from the proximal end rail and the distal end rail, wherein the middle rail is disposed between the first side rail and the second side rail, and wherein the first side rail comprises a second PWA worm gear. The bezel assembly may further comprise a second worm screw, wherein the second worm screw engages the second PWA worm gear. The second worm screw may be configured to translate the PWA in a second direction, the second direction being perpendicular to the first direction, wherein the first direction and the second direction define a plane.

An aircraft light assembly is disclosed herein. The aircraft light assembly may comprise: a reflector assembly including a reflector housing and a reflector, the reflector housing comprising a proximal end, a distal end, a first side, and a second side, the first side extending from the proximal end to the distal end, and the second side extending from the proximal end to the distal end, the proximal end comprising a first reflector housing worm gear; a printed wiring assembly (PWA) comprising a frame and a LED configured to emit light toward the reflector; and a bezel assembly comprising a frame and a first worm screw disposed in a slot of the frame, the first worm screw configured to translate the reflector assembly in a first direction.

In various embodiments, the first worm screw may engage the first reflector housing worm gear. The frame may comprise a proximal end rail having a proximal end slot, the first worm screw disposed within the proximal end slot. The frame may comprise a proximal end rail having a PWA worm gear. The first worm screw may engage the PWA worm gear. The light assembly may further comprise a coating disposed between the frame of the PWA and the reflector assembly. The first side may comprise a second reflector housing worm gear. The bezel assembly may further comprise a second worm screw, wherein the second worm screw engages the second reflector housing worm gear. The second worm screw may be configured to translate the reflector assembly in a second direction, the second direction being perpendicular to the first direction, wherein the first direction and the second direction define a plane.

An aircraft is disclosed herein. The aircraft may comprise: a light assembly comprising: a reflector assembly including a reflector housing and a reflector; a printed wiring assembly (PWA) comprising a frame and a light emitting diode (LED); and a bezel assembly comprising a frame, a first worm screw, and a second worm screw, the frame comprising a proximal end rail, a distal end rail, a side rail, a first side rail extending from the proximal end rail to the distal end rail, and a second side rail extending from the proximal end rail to the distal end rail and disposed opposite the first side rail, the first worm screw disposed in a first slot of the proximal end rail of the frame, the second worm screw disposed in a second slot of the first side rail of the frame, wherein the first worm screw is configured to translate at least one of the PWA and the reflector assembly in a first direction, and wherein the second worm screw is configured to translate at least one of the PWA and the reflector assembly in a second direction, wherein the second direction is perpendicular to the first direction.

In various embodiments, the light assembly is configured to adjust a beam direction of the LED based on translating at least one of the PWA and the reflector assembly in a plane defined by the first direction and the second direction.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

As used herein, "aft" refers to the direction associated with a tail (e.g., the back end) of an aircraft, or generally, to the direction of exhaust of a gas turbine engine. As used herein, "forward" refers to the direction associated with a nose (e.g., the front end) of the aircraft, or generally, to the direction of flight or motion.

Figure 1:
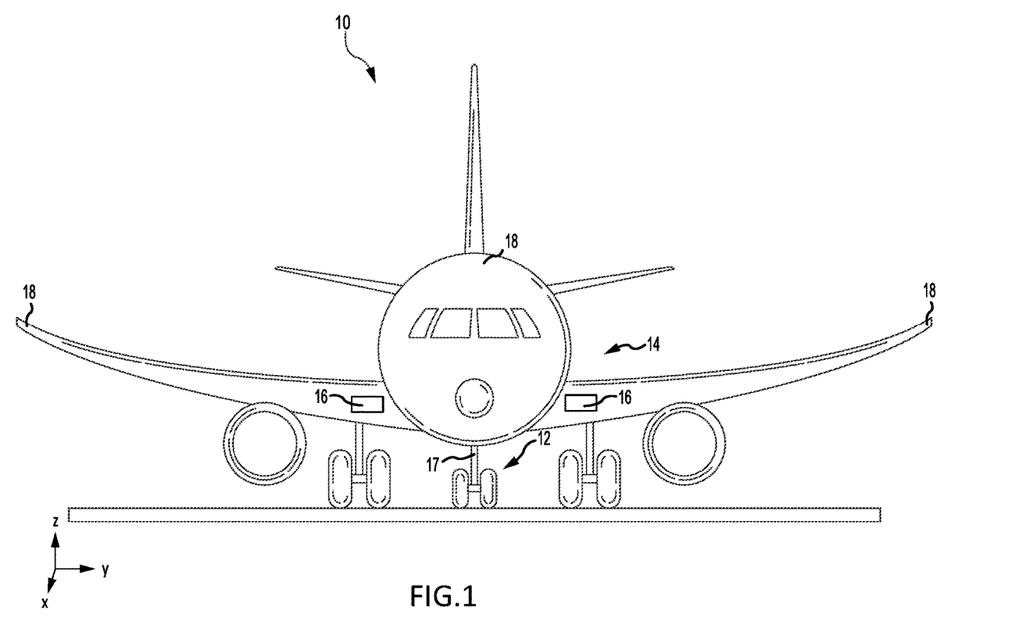
FIG. 1 illustrates an aircraft, in accordance with various embodiments.

With reference to FIG. 1, an aircraft 10 in accordance with various embodiments may comprise aircraft systems, for example, one or more landing gear such as landing gear 12, which may generally support aircraft 10 when aircraft is not flying, allowing aircraft 10 to taxi, take off, and land without damage. Aircraft 10 may include one or more exterior lamps 14 such as, for example, landing lights 16, taxi lights 17, and navigation lights 18. Aircraft 10 may include any number of other exterior lamps 14 such as logo lights, runway turnoff lights, engine scan lights, anti-collision lights, strobe lights, beacon lights, cargo compartment lights, obstruction lights, landing gear lights, and/or the like.

Figure 2:
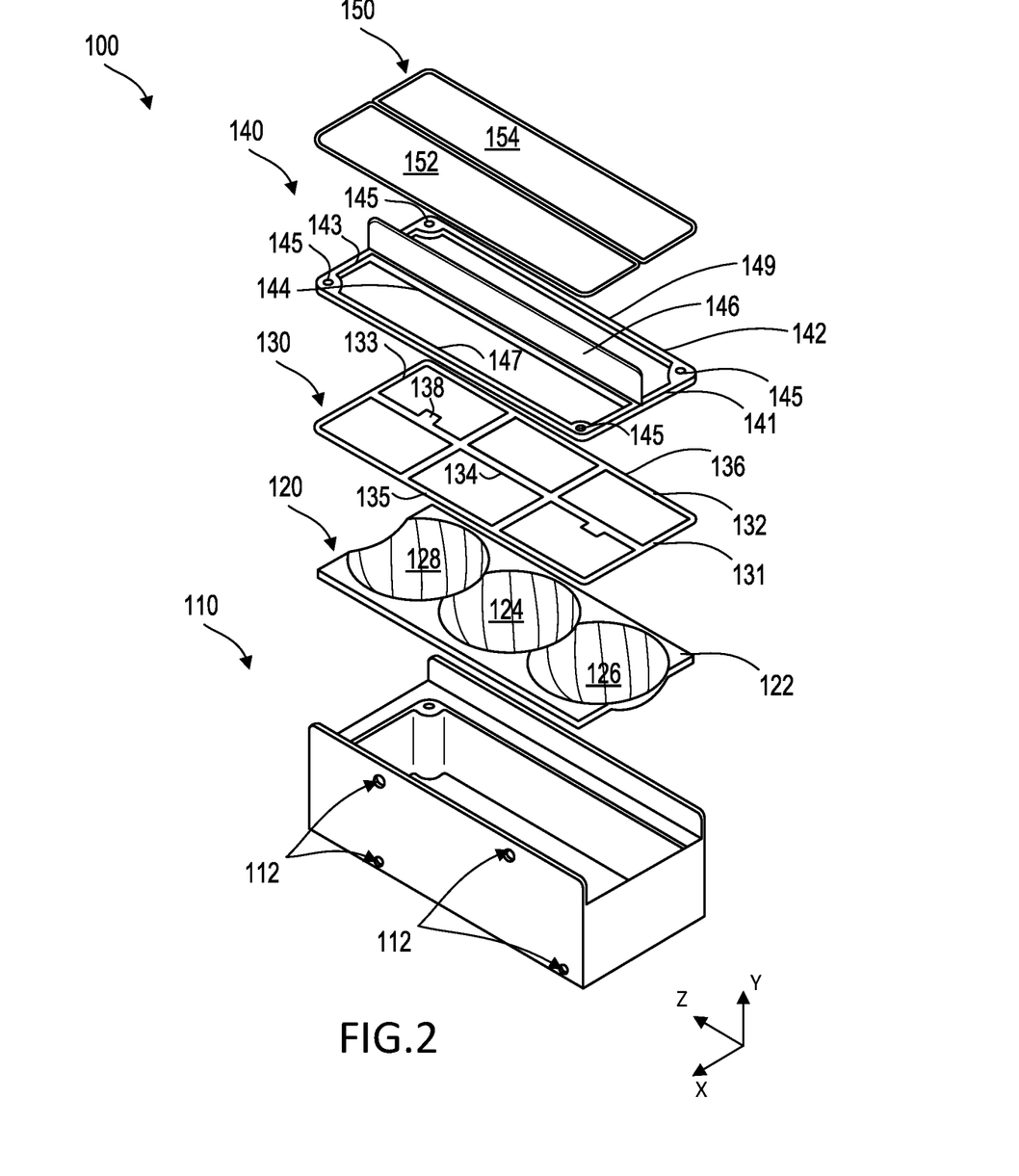
FIG. 2 illustrates an aircraft light assembly, in accordance with various embodiments.

With reference now to FIG. 2, an exploded view of an aircraft light assembly, in accordance with various embodiments, is illustrated. The aircraft light assembly 100 may be a taxi light (e.g., taxi lights 17), a landing light (e.g., landing lights 16), or the like. In various embodiments, the aircraft light assembly 100 may comprise a housing 110, a reflector assembly 120, a printed wiring assembly 130, a bezel assembly 140, and a lens assembly 150.

The housing 110 may comprise a plurality of apertures 112. Each aperture in the plurality of apertures may be configured to couple the housing to an aircraft. For example, each aperture in the plurality of apertures 112 may comprise an insert configured to receive a bolt and couple the housing to an aircraft. The housing 110 may be made of any material known in the art. For example, the housing 110 could be made of plastic, aluminum, a composite material, or the like.

The reflector assembly 120 comprises a reflector housing 122 and a first reflector 124. In various embodiments, the reflector assembly 120 may comprise a second reflector 126 and a third reflector 128. Although illustrated with three reflectors, any number of reflectors is within the scope of this disclosure. Each reflector 124, 126, 128 may be coupled to the reflector housing 122 by any method known in the art, such as press fit, an adhesive, or the like. Each reflector 124, 126, 128 may be made of any material known in the art. In various embodiments, each reflector 124, 126, 128 is made of aluminum, plastic, or the like. In various embodiments, each reflector 124, 126, 128 may have a concave side proximate the printed wiring assembly 130.

The printed wiring assembly 130 comprises a frame 132 defining a perimeter of the printed wiring assembly 130. The printed wiring assembly 130 further comprises a middle rail 134 extending from a proximal end 131 of the frame 132 in a first direction (e.g., the z-direction) to a distal end 133 of the frame 132. The middle rail 134 may be disposed between a first side rail 135 and a second side rail 136 of frame 132. In various embodiments, each side rail 135, 136 of frame 132 may be substantially parallel to middle rail 134. In various embodiments, middle rail 134 may comprise a protrusion 138 extending substantially perpendicular to middle rail 134. "Substantially perpendicular," as described herein is perpendicular+/−5°, and "substantially parallel" as described herein is parallel+/−5°. Protrusion 138 may be configured to receive a light emitting diode (LED). The printed wiring assembly 130 may be made of any material known in the art. For example, the printed wiring assembly 130 may be made of polyimide epoxy, a metal core, such as aluminum-copper, or the like.

The bezel assembly 140 comprises a frame 142, a fin support 144, and a fin 146. The fin support 144 may extend from a proximal end 141 of frame 142 in the first direction (i.e., the z-direction) to a distal end 143 of the frame 142. The frame 142 may further comprise a plurality of apertures 145 configured to couple the bezel assembly 140 to the housing 110 and to couple the reflector assembly 120 and/or the printed wiring assembly 130 to the housing assembly. The bezel assembly 140 may be configured to receive a first lens 152 of the lens assembly 150 between the fin support 144 and a first side rail 147 of frame 142. Similarly, the bezel assembly 140 may be configured to receive a second lens 154 of the lens assembly 150 between the fin support 144 and a second side rail 149 of frame 142. Although depicted with two lenses, any number of lenses is within the scope of this disclosure.

Figure 3:
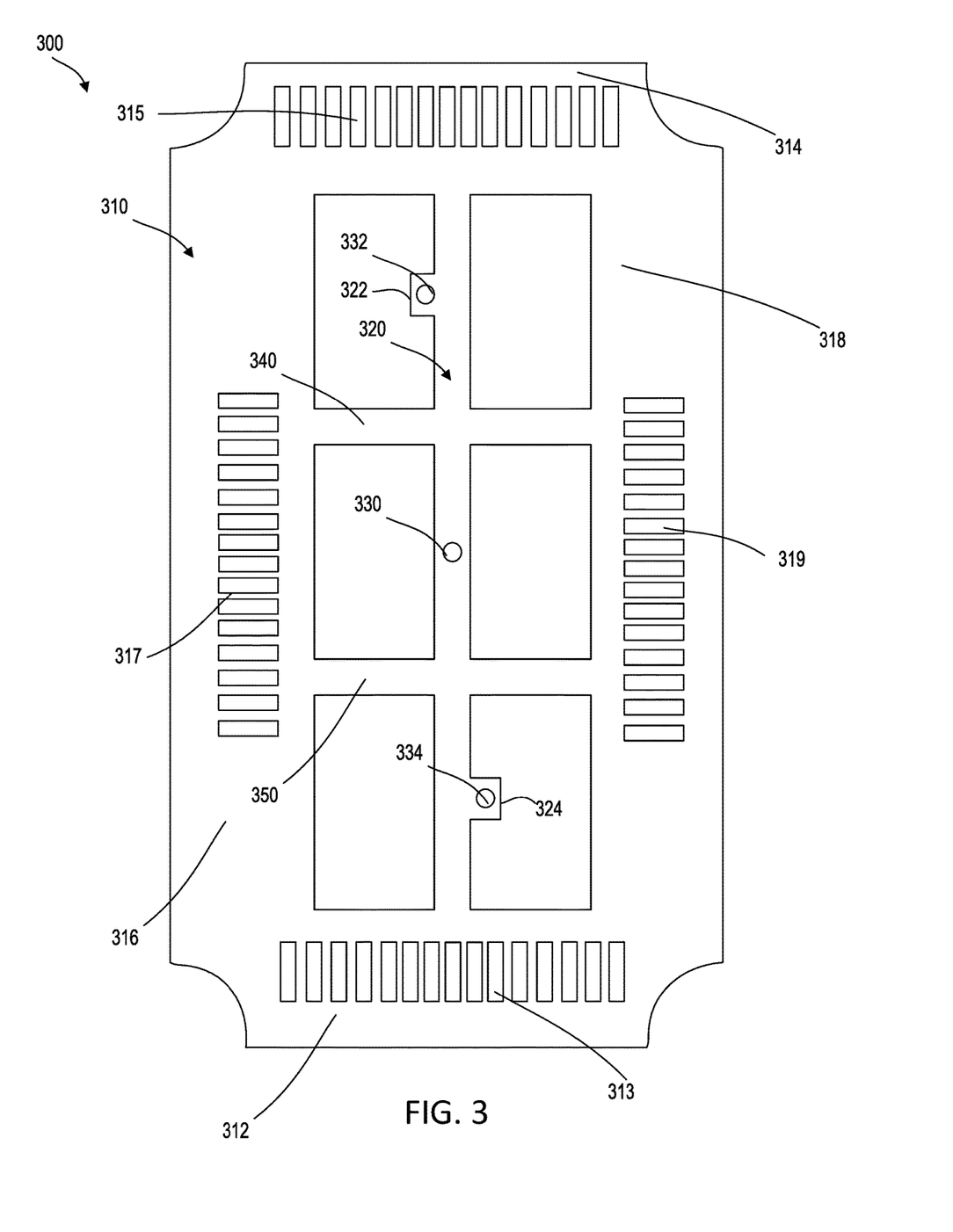
FIG. 3 illustrates a printed wiring assembly for use in an aircraft light assembly, in accordance with various embodiments.

Referring now to FIG. 3, a printed wiring assembly 300, in accordance with various embodiments, is illustrated. The printed wiring assembly 300 comprises a frame 310, a middle rail 320, and a first light emitting diode (LED) 330. The frame 310 comprises a proximal end rail 312, a distal end rail 314, a first side rail 316, and a second side rail 318. Each rail of frame 310 may comprise a worm gear. For example, proximal end rail 312 may comprise a proximal worm gear 313 and distal end rail 314 may comprise a distal worm gear 315. Similarly, first side rail 316 may comprise a first side worm gear 317, and second side rail 318 may comprise a second side worm gear 319. In various embodiments, a "worm gear" as described herein is a gear having teeth that twist either clockwise (e.g., a right hand helical gear) or teeth that twist counter-clockwise (e.g., a left hand helical gear). Each worm gear may be configured to interface with a worm screw from a bezel assembly to adjust a positioning of the printed wiring assembly 300.

The printed wiring assembly 300 may further comprise a first support rail 340 extending from first side rail 316 to second side rail 318. The first support rail 340 may be disposed between proximal end rail 312 and distal end rail 314. The first support rail 340 may be proximate to distal end rail 314. The printed wiring assembly 300 may further comprise a second support rail 350 extending from first side rail 316 to second side rail 318. The second support rail 350 may be disposed between first support rail 340 and proximal end rail 312.

The middle rail 320 may further comprise a first protrusion 322 extending towards first side rail 316 and disposed between first support rail 340 and distal end rail 314. The middle rail 320 may further comprise a second protrusion 324 extending towards second side rail 318 and disposed between second support rail 350 and proximal end rail 312.

The printed wiring assembly 300 may further comprise a second LED 332 coupled to the first protrusion 322. The printed wiring assembly 300 may further comprise a third LED 334 coupled to the second protrusion 324. In various embodiments, the first LED 330 is coupled to the middle rail 320 proximate a center of middle rail 320.

Figure 4:
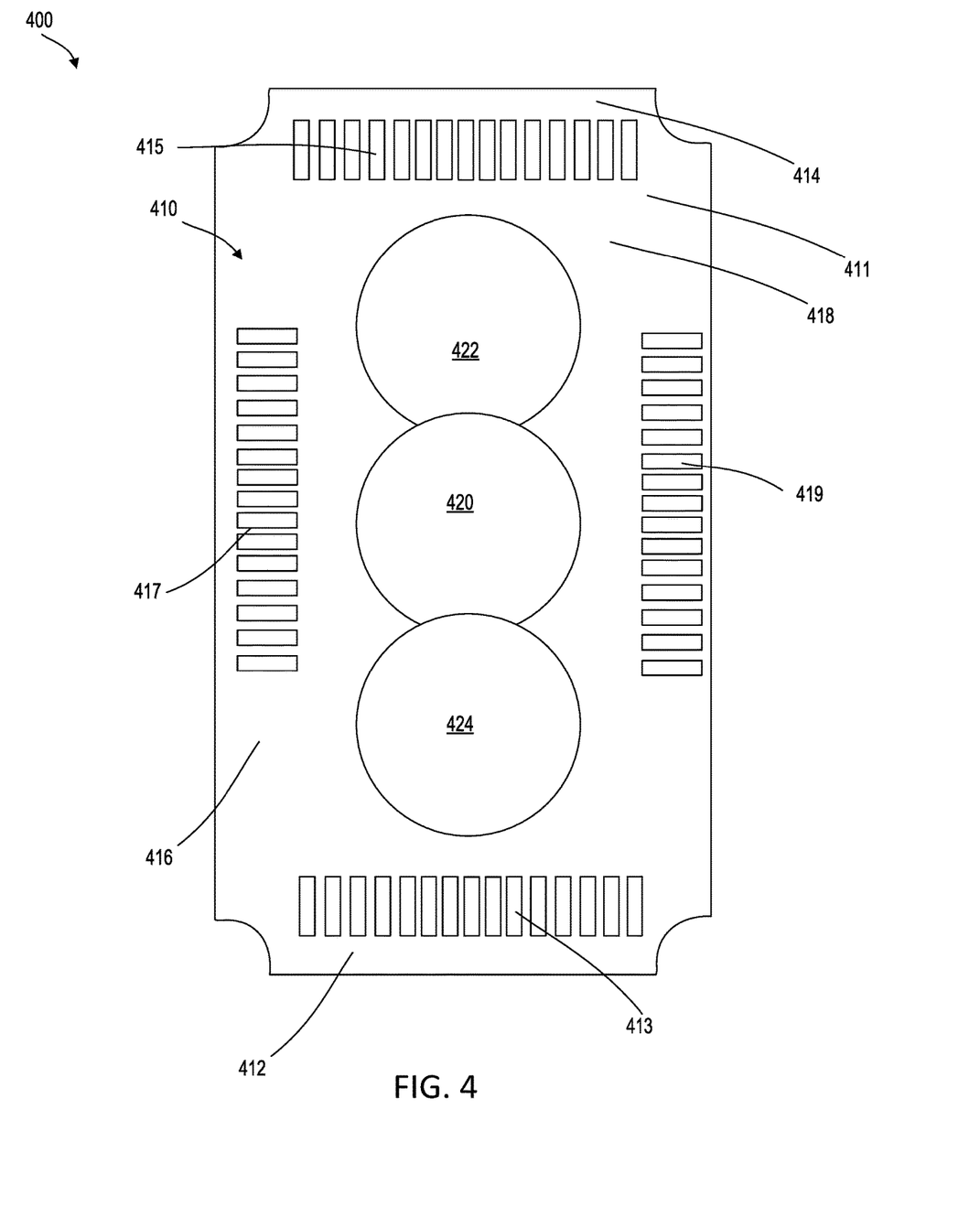
FIG. 4 illustrates a reflector assembly for use in an aircraft light assembly, in accordance with various embodiments.

Referring now to FIG. 4, a reflector assembly 400 in accordance with various embodiments, is illustrated. The reflector assembly 400 comprises a reflector housing 410 and a first reflector 420. The reflector housing 410 comprises a reflector frame 411 including a proximal end 412, a distal end 414 opposite the proximal end 412, a first side 416 extending from the proximal end 412 to the distal end 414, and a second side 418 opposite the first side 416 and extending between the proximal end 412 and the distal end 414. Each side and each end of the reflector housing 410 may comprise a worm gear. For example, proximal end 412 may comprise a proximal worm gear 413, and/or distal end 414 may comprise a distal worm gear 415. Similarly, first side 416 may comprise a first side worm gear 417, and second side 418 may comprise a second side worm gear 419. In various embodiments, a "worm gear" as described herein is a gear having teeth that twist either clockwise (e.g., a right hand helical gear) or teeth that twist counter-clockwise (e.g., a left hand helical gear). Each worm gear may be configured to interface with a worm screw from a bezel assembly to adjust a positioning of reflector assembly 400.

The reflector assembly 400 may further comprise a second reflector 422 disposed between the first reflector 420 and distal end 414. Similarly, the reflector assembly 400 may further comprise a third reflector 424 disposed between the first reflector and proximal end 412.

Figure 5:
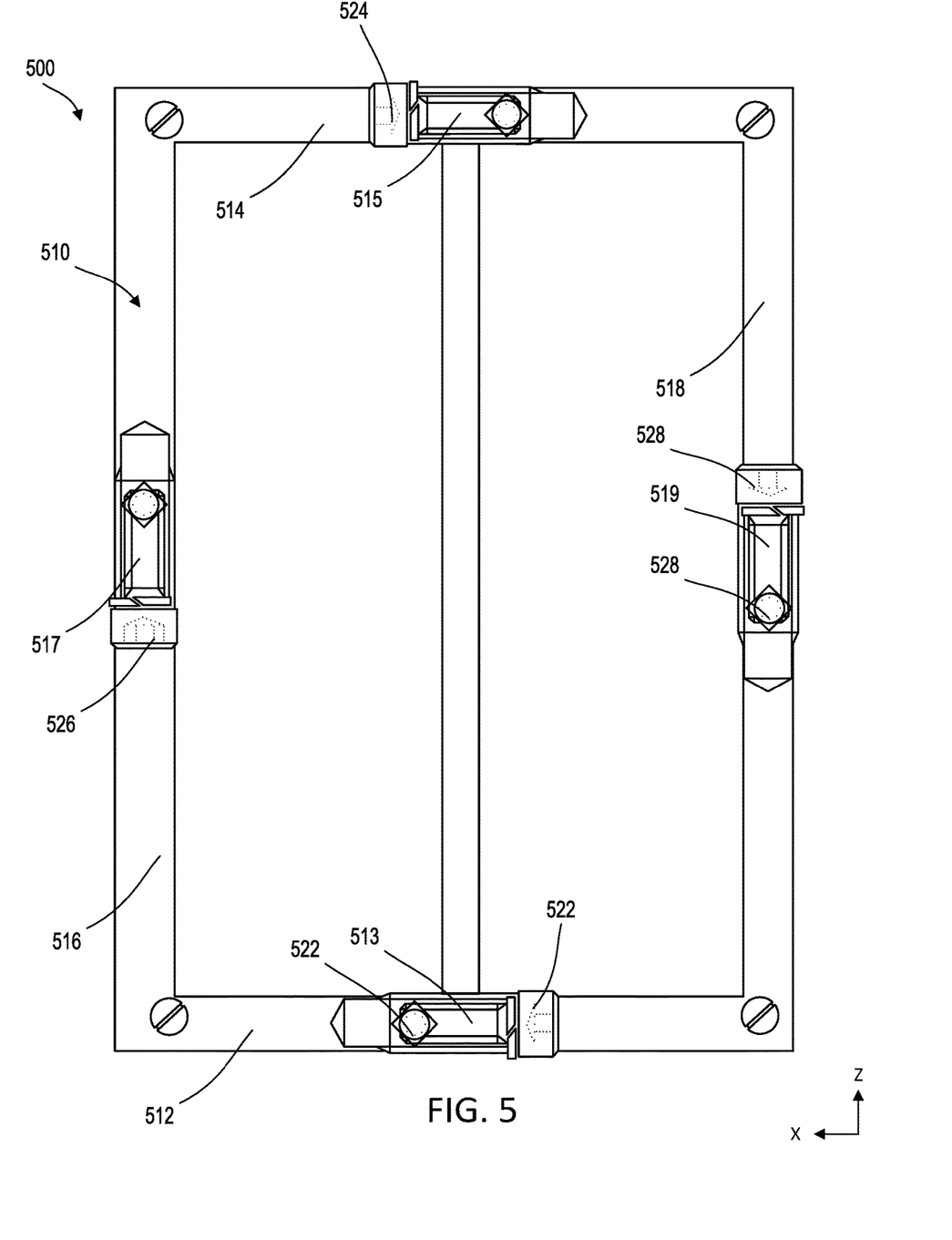
FIG. 5 illustrates a bezel assembly for use in an aircraft light assembly, in accordance with various embodiments.

Referring now to FIG. 5, a bezel assembly 500, in accordance with various embodiments, is illustrated. The bezel assembly 500 comprises a frame 510. The frame 510 comprises a proximal end rail 512, a distal end rail 514, a first side rail 516, and a second side rail 518. Each rail may comprise a slot configured to receive a worm screw. For example, proximal end rail 512 may have a proximal end rail slot 513 and distal end rail 514 may have a distal end rail slot 515. Similarly, first side rail 516 may have a first side rail slot 517 and second side rail 518 may have a second side rail slot 519.

The bezel assembly 500 may further comprise a first worm screw 522 and a second worm screw 526. In various embodiments, first worm screw 522 may be disposed in proximal end rail 512 and second worm screw 526 may be disposed in first side rail 516. In various embodiments, first worm screw 522 is configured to engage proximal worm gear 313 of printed wiring assembly 300 and/or proximal worm gear 413 of reflector assembly 400. In various embodiments, the first worm screw 522 may be configured to translate the printed wiring assembly 300 and/or the reflector assembly 400, and bezel assembly 500 along a first direction (e.g., along the x-axis). For example, a user may rotate a head of first worm screw 522 counter-clockwise, the printed wiring assembly 300 may move opposite the first direction (e.g. in the −X direction). Similarly, the second worm screw 526 may be configured to translate the printed wiring assembly 300 and/or the reflector assembly 400, and bezel assembly 500 along a second direction (e.g., along the z-axis). In various embodiments, the second direction may be substantially perpendicular to the first direction.

In various embodiments, when printed wiring assembly 300 and reflector assembly 400 are used in combination, the proximal worm gear 313 of printed wiring assembly 300 may be configured to translate printed wiring assembly 300 in an opposite direction of proximal worm gear 413 of reflector assembly 400. For example, a user may rotate a head of first worm screw 522 counter-clockwise, the printed wiring assembly 300 may move in the negative X direction and the reflector assembly 400 may move in the X-direction. In various embodiments, bezel assembly 500 may be configured to translate in the same direction as the printed wiring assembly 300 or the reflector assembly 400.

In various embodiments, bezel assembly 500 may further comprise a third worm screw 524 disposed in distal end rail 514 of bezel assembly 500 and a fourth worm screw 528 disposed in second side rail 518 of bezel assembly 500. In various embodiments, first worm screw 522 and third worm screw 524 are twisted in opposite directions to translate bezel assembly 500 in a first direction. For example, first worm screw 522 may be twisted counter-clockwise and third worm screw 524 may be twisted clockwise to translate in the −X direction.

Figure 6:
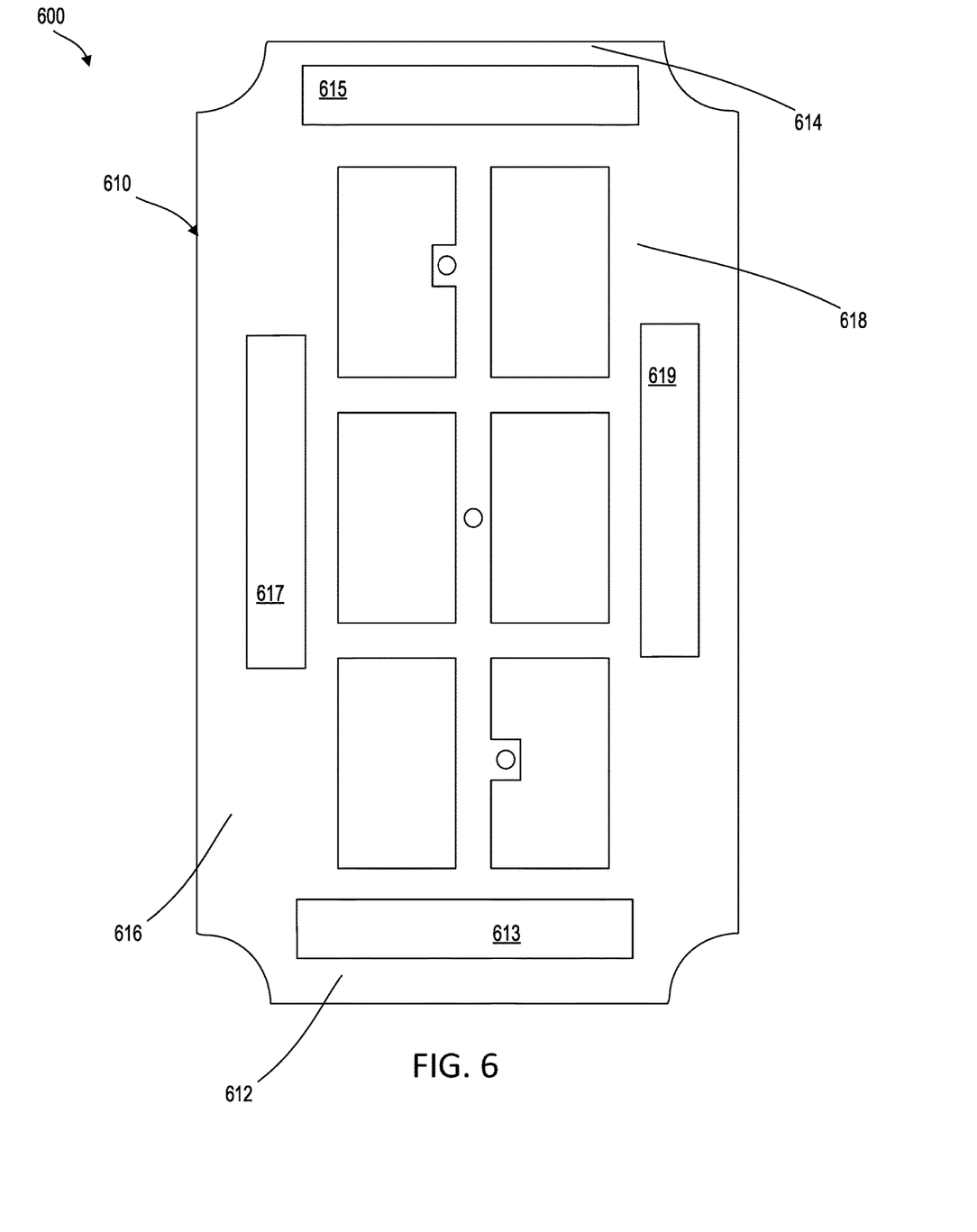
FIG. 6 illustrates a printed wiring assembly for use in an aircraft light assembly, in accordance with various embodiments.

Referring now to FIG. 6, a printed wiring assembly 600, in accordance with various embodiments, is illustrated. Printed wiring assembly 600 may be in accordance with the printed wiring assembly 300, except each worm gear is replaced with a respective slot. For example, printed wiring assembly 600 comprises a frame 610 including a plurality of slots. The frame 610 comprises a proximal end rail 612, a distal end rail 614, a first side rail 616, and a second side rail 618. Each rail of frame 610 may comprise a slot. For example, proximal end rail 612 may comprise a proximal slot 613 and distal end rail 614 may comprise a distal slot 615. Similarly, first side rail 616 may comprise a first side slot 617, and second side rail 618 may comprise a second side slot 619. In various embodiments, each slot is configured to have disposed therebetween a worm screw. In various embodiments, each slot may be configured to remain separated from the worm screw.

Figure 7:
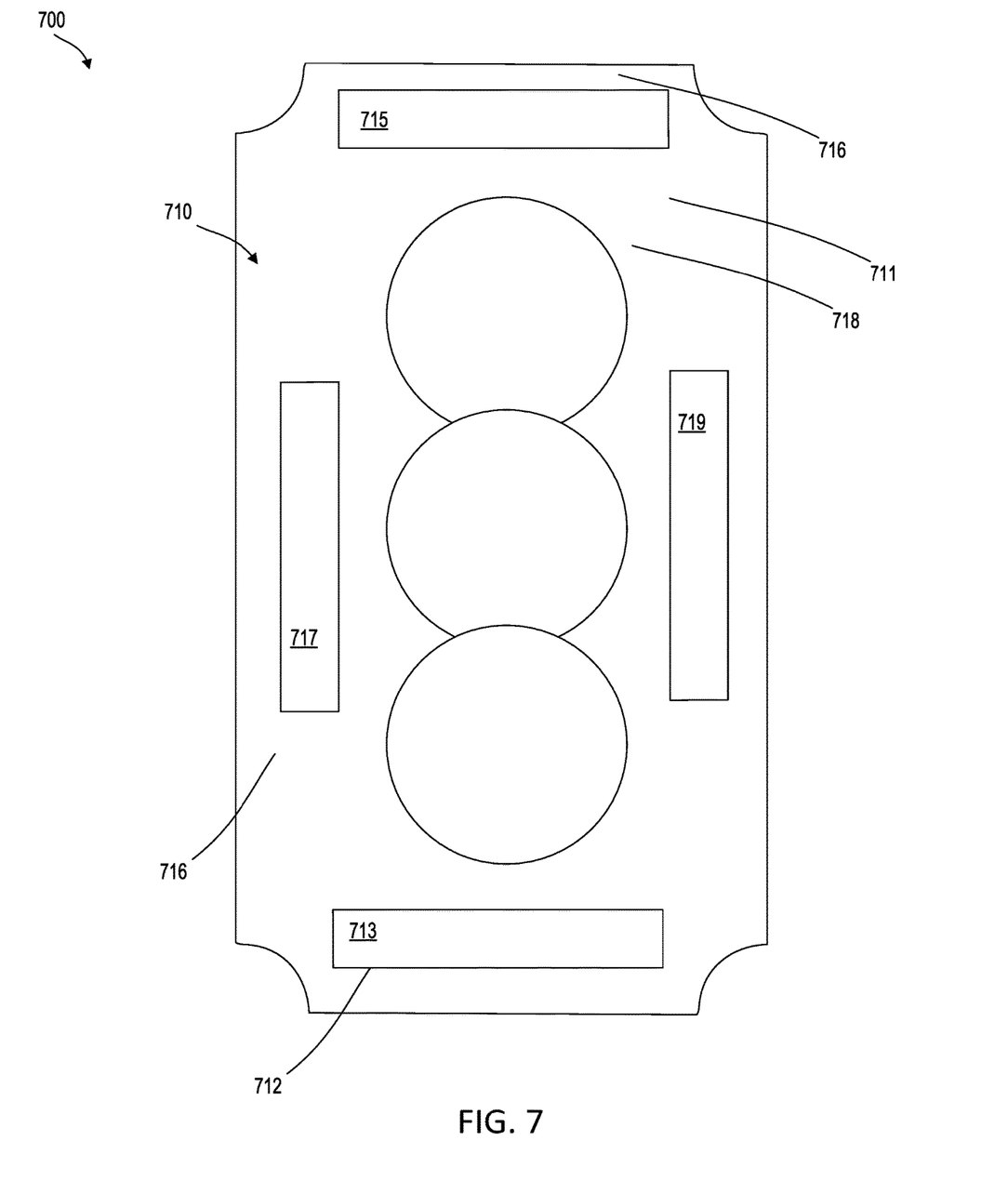
FIG. 7 illustrates a reflector assembly for use in an aircraft light assembly, in accordance with various embodiments.

Referring now to FIG. 7, a reflector assembly 700, in accordance with various embodiments, is illustrated. The reflector assembly 700 may be in accordance with reflector assembly 400, except each worm gear is replaced with a respective slot. For example, the reflector assembly 700 comprises a reflector housing 710. The reflector housing 710 comprises a reflector frame 711 including a proximal end 712, a distal end 714 opposite the proximal end 712, a first side 716 extending from the proximal end 712 to the distal end 714, and a second side 718 opposite the first side 716 and extending between the proximal end 712 and the distal end 714. Each side and each end of the reflector housing 710 may comprise a slot. For example, proximal end 712 may comprise a proximal slot 713, and/or distal end 714 may comprise a distal slot 715. Similarly, first side 716 may comprise a first side slot 717, and second side 718 may comprise a second side slot 719. In various embodiments, each slot is configured to have disposed therebetween a worm screw. In various embodiments, each slot may be configured to remain separated from the worm screw.

Figure 8A:
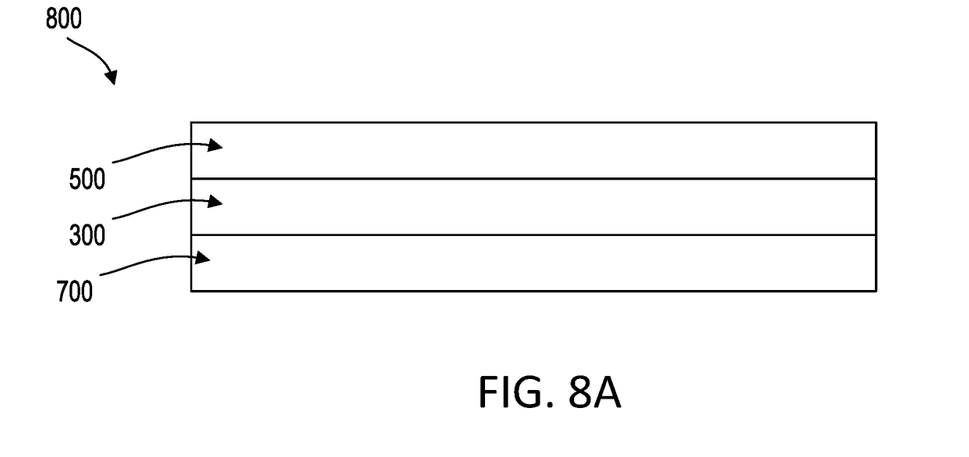
FIG. 8A illustrates an aircraft light assembly, in accordance with various embodiments.

Referring now to FIG. 8A, a portion of an aircraft light assembly 800, in accordance with various embodiments, is illustrated. The aircraft light assembly 800 comprises a printed wiring assembly 300, a reflector assembly 700, and a bezel assembly 500. In various embodiments, a coating is disposed between printed wiring assembly 300 and reflector assembly 700. The coating may be disposed on the frame 310 of printed wiring assembly 300, on the reflector housing 710 of reflector assembly 700, or both. In various embodiments, the coating is an acetal resin, or any other synthetic polymer known in the art. The coating may be configured to allow the printed wiring assembly 300 and bezel assembly 500 to translate relative to the reflector assembly 700 without binding due to friction.

Figure 8B:
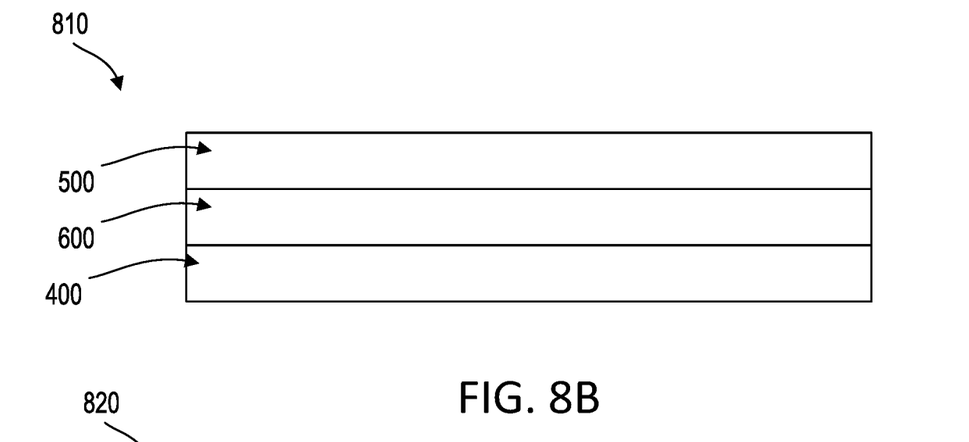
FIG. 8B illustrates an aircraft light assembly, in accordance with various embodiments.

Referring now to FIG. 8B, a portion of an aircraft light assembly 810, in accordance with various embodiments, is illustrated. The aircraft light assembly 810 comprises a printed wiring assembly 600, a reflector assembly 400, and a bezel assembly 500. In various embodiments, a first coating is disposed between printed wiring assembly 600 and reflector assembly 400. A second coating may also be disposed between the bezel assembly 500 and the printed wiring assembly 600. The first coating may be disposed on the frame 610 of the printed wiring assembly 600, on the reflector housing 410 of reflector assembly 400, or both. The second coating may be disposed on frame 510, on printed wiring assembly 600, or both. In various embodiments, the first coating and the second coating are an acetal resin, or any other synthetic polymer known in the art. The first coating and the second coating may be configured to allow the reflector assembly 400 and bezel assembly 500 to translate relative to the printed wiring assembly 600 without binding up due to friction.

Figure 8C:
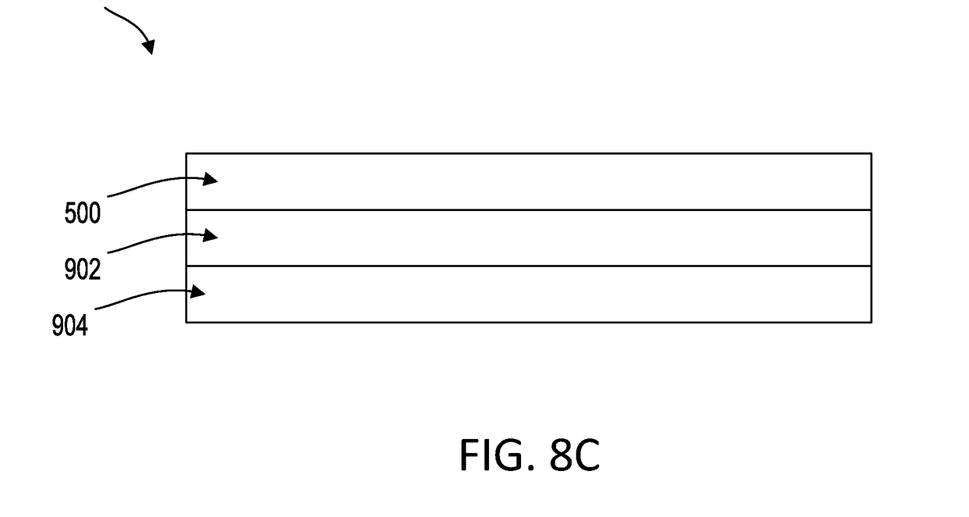
FIG. 8C illustrates an aircraft light assembly, in accordance with various embodiments.

Referring now to FIG. 8C, a portion of an aircraft light assembly 820, in accordance with various embodiments, is illustrated. The aircraft light assembly 820 comprises a printed wiring assembly 902, a reflector assembly 904, and a bezel assembly 500. Printed wiring assembly 902 may be a hybrid of printed wiring assembly 300 and printed wiring assembly 600 (e.g., printed wiring assembly 902 may have first side worm gear 317, second side worm gear 319, proximal end slot 613, and distal end slot 615) and reflector assembly 904 may be a hybrid of reflector assembly 400 and reflector assembly 700 (e.g., reflector assembly 904 may have a proximal end worm gear 413 and a distal end worm gear 415). A hybrid configuration, as described may allow the printed wiring assembly 902 to translate vertically only (i.e., along Z-axis from FIG. 5) and reflector assembly 904 to translate horizontally only (i.e., along X-axis from FIG. 5), or vice versa. In various embodiments, a coating is disposed between printed wiring assembly 902 and reflector assembly 904. The coating may be disposed on the frame of printed wiring assembly 902, on the reflector housing of reflector assembly 904, or both. In various embodiments, the coating is an acetal resin, or any other synthetic polymer known in the art. The coating may be configured to allow the printed wiring assembly 300 and bezel assembly 500 to translate relative to the reflector assembly 700 without binding due to friction.

Figure 9:
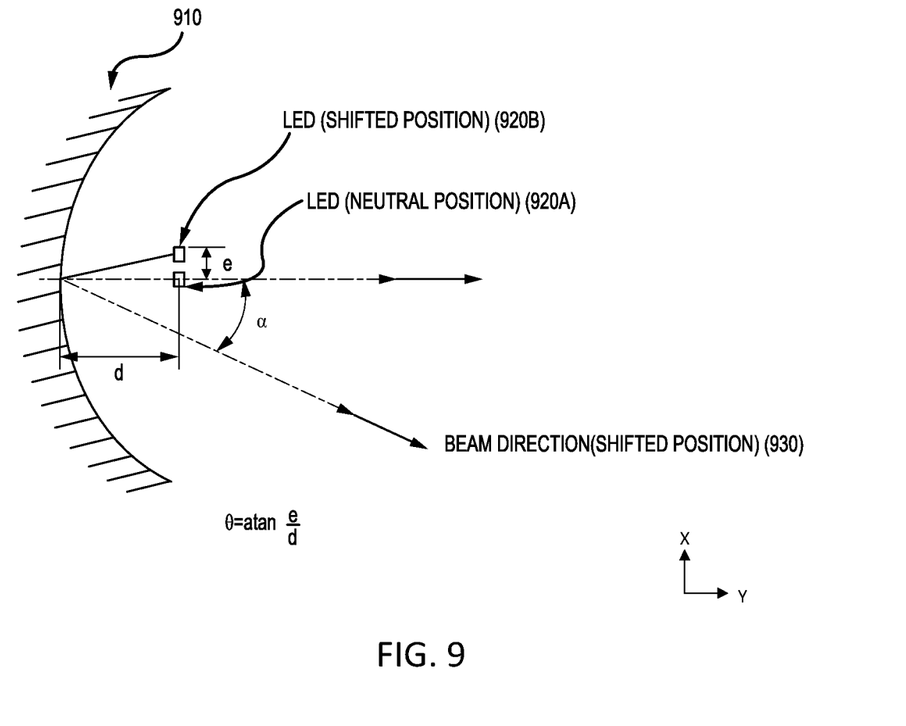
FIG. 9 illustrates a comparison between a light emitting diode (LED) in a neutral position compared to a shifted position in a light assembly, in accordance with various embodiments.

Referring now to FIG. 9, an LED in a neutral position compared to an LED in a shifted position, in accordance with various embodiments, is illustrated. As shown, when an LED 920A is in a neutral position and directed towards a reflector 910, the reflector 910 directs the light projected from the LED 920A in the opposite direction of the initial direction (i.e., the reflector 910 reflects the emitted light directly back at the LED 920A along the Y-axis). By translating LED 920B a shifted distance e along the x-axis a shifted beam direction may be achieved. For example, based on a distance d that LED 920A is away from a focal point of reflector 910 when LED 920A is in a neutral position and the shifted distance e, a shifted beam direction 930 can be calculated as an angle $\alpha$ relative to the y-direction (e.g., angle $\alpha$ is equal to the arc-tangent of shifted distance e divided by distance d). As such, aircraft light assemblies 800, 810, and 820 allow shifting of an LED relative to a respective reflector within 360° of a plane (e.g., X-Z plane), which allows more customizable beam directions for an aircraft lighting system.

Although described herein with respect to reflector assembly 120, each element of reflector assembly 120 may alternatively be applied to lens assembly 150 to adjust lens assembly 150 relative to the various components of aircraft light assembly 100.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An aircraft light assembly, comprising:
   a reflector assembly including a reflector housing and a reflector;
   a printed wiring assembly (PWA) comprising a PWA frame, a middle rail, and a light emitting diode (LED), the PWA frame having a proximal end rail and a distal end rail, the middle rail extending from the proximal end rail to the distal end rail, the LED coupled to the middle rail and disposed proximate the reflector, the proximate end rail comprising a first PWA worm gear; and
   a bezel assembly comprising a bezel frame and a first worm screw disposed in a slot of the bezel frame, the first worm screw configured to translate the PWA in a first direction, wherein:
   the first worm screw engages the first PWA worm gear, and
   the reflector housing comprises a proximal end having a proximal end slot, the first worm screw disposed within the proximal end slot.

2. The aircraft light assembly of claim 1, wherein the PWA frame further comprises a first side rail extending from the proximal end rail and the distal end rail, and a second side rail opposite the first side rail and extending from the proximal end rail and the distal end rail, wherein the middle rail is disposed between the first side rail and the second side rail, and wherein the first side rail comprises a second PWA worm gear.

3. The aircraft light assembly of claim 2, wherein the bezel assembly further comprises a second worm screw, wherein the second worm screw engages the second PWA worm gear.

4. The aircraft light assembly of claim 3, wherein the second worm screw is configured to translate the PWA in a second direction, the second direction being perpendicular to the first direction, wherein the first direction and the second direction define a plane.

5. The aircraft light assembly of claim 1, wherein the proximal end includes a reflector worm gear.

6. The aircraft light assembly of claim 5, wherein the first worm screw engages the reflector worm gear.

7. The aircraft light assembly of claim 1, further comprising a coating disposed between the PWA frame and the reflector assembly.

8. An aircraft light assembly, comprising:
   a reflector assembly including a reflector housing and a reflector, the reflector housing comprising a proximal end, a distal end, a first side, and a second side, the first side extending from the proximal end to the distal end, and the second side extending from the proximal end to the distal end, the proximal end comprising a first reflector housing worm gear;
   a printed wiring assembly (PWA) comprising a PWA frame and a LED configured to emit light toward the reflector; and
   a bezel assembly comprising a bezel frame and a first worm screw disposed in a slot of the bezel frame, the first worm screw configured to translate the reflector assembly in a first direction, wherein:
   the first worm screw engages the first reflector housing worm gear, and
   the bezel frame comprises a proximal end rail having a proximal end slot, the first worm screw disposed within the proximal end slot.

9. The aircraft light assembly of claim 8, wherein the first side comprises a second reflector housing worm gear.

10. The aircraft light assembly of claim 9, wherein the bezel assembly further comprises a second worm screw, wherein the second worm screw engages the second reflector housing worm gear.

11. The aircraft light assembly of claim 10, wherein the second worm screw is configured to translate the reflector assembly in a second direction, the second direction being perpendicular to the first direction, wherein the first direction and the second direction define a plane.

12. The aircraft light assembly of claim 8, wherein the the proximal end rail includes a PWA worm gear.

13. The aircraft light assembly of claim 12, wherein the first worm screw engages the PWA worm gear.

14. The aircraft light assembly of claim 8, further comprising a coating disposed between the PWA frame and the reflector assembly.

15. An aircraft comprising:
   a light assembly comprising:
   a reflector assembly including a reflector housing and a reflector;
   a printed wiring assembly (PWA) comprising a PWA frame and a light emitting diode (LED); and
   a bezel assembly comprising a bezel frame, a first worm screw, and a second worm screw, the bezel frame comprising a proximal end rail, a distal end rail, a side rail, a first side rail extending from the proximal end rail to the distal end rail, and a second side rail extending from the proximal end rail to the distal end rail and disposed opposite the first side rail, the first worm screw disposed in a first slot of the proximal end rail of the bezel frame, the second worm screw disposed in a second slot of the first side rail of the bezel frame,
   wherein the first worm screw is configured to translate at least one of the PWA and the reflector assembly in a first direction, and
   wherein the second worm screw is configured to translate at least one of the PWA and the reflector assembly in a second direction, wherein the second direction is perpendicular to the first direction.

16. The aircraft of claim 15, wherein the light assembly is configured to adjust a beam direction of the LED based on translating at least one of the PWA and the reflector assembly in a plane defined by the first direction and the second direction.

17. An aircraft light assembly, comprising:
- a reflector assembly including a reflector housing and a reflector;
- a printed wiring assembly (PWA) comprising a PWA frame, a middle rail, and a light emitting diode (LED), the PWA frame having a proximal end rail and a distal end rail, the middle rail extending from the proximal end rail to the distal end rail, the LED coupled to the middle rail and disposed proximate the reflector, the proximate end rail comprising a first PWA worm gear; and
- a bezel assembly comprising a bezel frame and a first worm screw disposed in a slot of the bezel frame, the first worm screw configured to translate the PWA in a first direction, wherein the PWA further comprises a first side rail extending from the proximal end rail and the distal end rail, and a second side rail opposite the first side rail and extending from the proximal end rail and the distal end rail, wherein the middle rail is disposed between the first side rail and the second side rail, and wherein the first side rail comprises a second PWA worm gear.

18. An aircraft light assembly, comprising:
- a reflector assembly including a reflector housing and a reflector, the reflector housing comprising a proximal end, a distal end, a first side, and a second side, the first side extending from the proximal end to the distal end, and the second side extending from the proximal end to the distal end, the proximal end comprising a first reflector housing worm gear;
- a printed wiring assembly (PWA) comprising a PWA frame and a LED configured to emit light toward the reflector; and
- a bezel assembly comprising a bezel frame and a first worm screw disposed in a slot of the bezel frame, the first worm screw configured to translate the reflector assembly in a first direction, wherein:
  - the first side comprises a second reflector housing worm gear,
  - the bezel assembly further comprises a second worm screw, and
  - the second worm screw engages the second reflector housing worm gear.

* * * * *